(12) United States Patent
Nair

(10) Patent No.: US 8,299,140 B2
(45) Date of Patent: *Oct. 30, 2012

(54) DISCRETE INK PARTICLE WITH SOLID PHASE AND LIQUID PHASE

(75) Inventor: Mridula Nair, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 589 days.

This patent is subject to a terminal disclaimer.

(21) Appl. No.: 11/962,480

(22) Filed: Dec. 21, 2007

(65) Prior Publication Data

US 2009/0162775 A1    Jun. 25, 2009

(51) Int. Cl.
*C09D 11/00* (2006.01)
*G03G 9/00* (2006.01)

(52) U.S. Cl. .................. 523/160; 430/108.21

(58) Field of Classification Search .................. 523/160; 430/111.4, 109.3, 137.1, 137.15, 137.17, 430/108.21

See application file for complete search history.

(56) References Cited

U.S. PATENT DOCUMENTS

| | | | |
|---|---|---|---|
| 2,932,629 A | 4/1960 | Wiley | |
| 2,934,530 A | 4/1960 | Ballast et al. | |
| 3,615,972 A | 10/1971 | Morehouse, Jr. et al. | |
| 4,314,932 A | 2/1982 | Wakimoto et al. | |
| RE31,072 E | 11/1982 | Jadwin et al. | |
| 4,758,492 A | 7/1988 | Nair | |
| 4,814,253 A * | 3/1989 | Gruber et al. | 430/110.1 |
| 4,833,060 A | 5/1989 | Nair et al. | |
| 4,965,131 A | 10/1990 | Nair et al. | |
| 5,601,960 A * | 2/1997 | Mahabadi et al. | 430/137.15 |
| 5,698,616 A | 12/1997 | Baker et al. | |
| 6,255,363 B1 | 7/2001 | Baker et al. | |
| 6,531,256 B1 * | 3/2003 | Bedells et al. | 430/137.14 |
| 2002/0081509 A1 | 6/2002 | Yoshida et al. | |
| 2003/0087174 A1 * | 5/2003 | Wagner et al. | 430/124 |
| 2005/0181295 A1 | 8/2005 | Fujii et al. | |
| 2007/0141501 A1 * | 6/2007 | Jin et al. | 430/111.4 |

FOREIGN PATENT DOCUMENTS

| | | |
|---|---|---|
| EP | 1 291 398 A1 | 3/2003 |
| JP | 56-142539 | 11/1981 |
| JP | 63-147171 | 6/1988 |
| JP | 04-296868 | 10/1992 |
| JP | 05-313401 | 11/1993 |

* cited by examiner

*Primary Examiner* — Ling Choi
*Assistant Examiner* — Gennadiy Mesh
(74) *Attorney, Agent, or Firm* — Andrew J. Anderson

(57) ABSTRACT

The present invention is an ink comprising a solid phase and a liquid phase wherein the solid phase comprises a polymeric binder and the liquid phase comprises oil and a pigment, the solid phase and the liquid phase forming a discrete particle having multiple domains of the liquid phase.

19 Claims, 1 Drawing Sheet

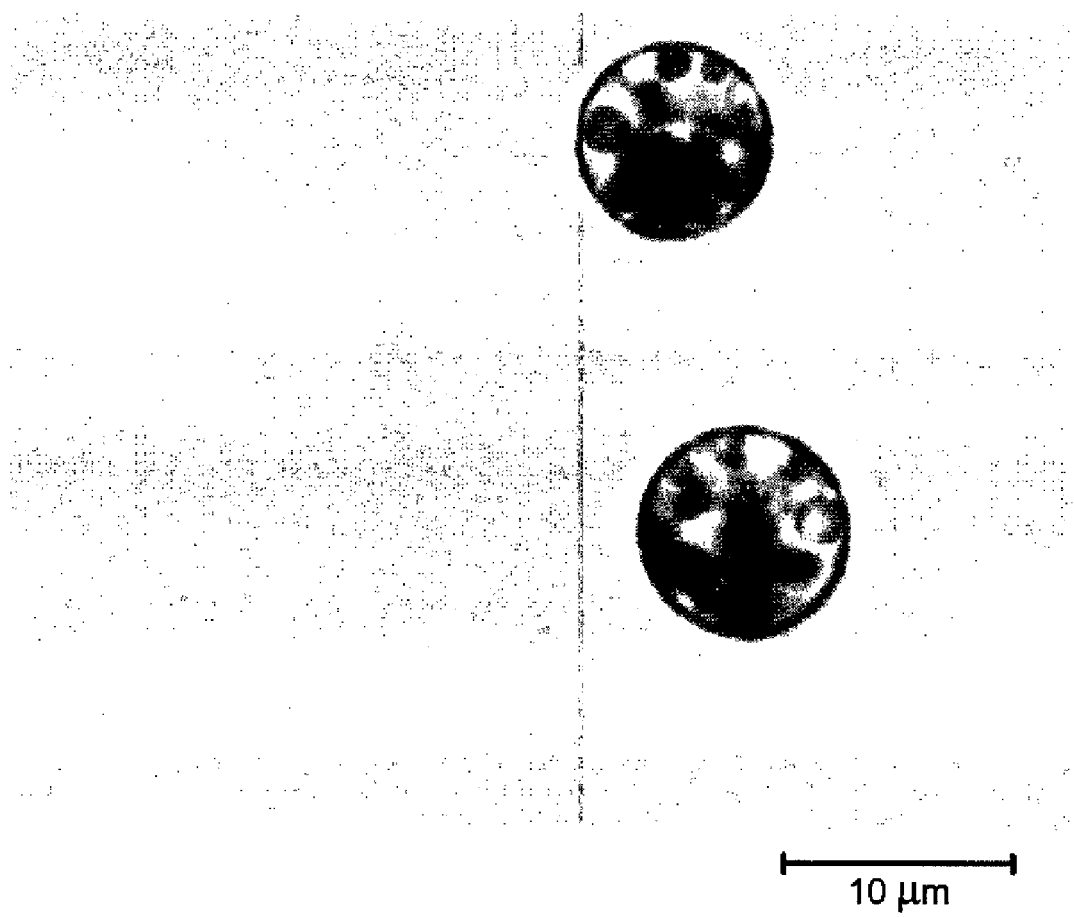

DISCRETE INK PARTICLE WITH SOLID PHASE AND LIQUID PHASE

CROSS-REFERENCE TO RELATED APPLICATIONS

This application relates to commonly assigned application Ser. No. 11/962,520filed simultaneously herewith and hereby incorporated by reference for all that it discloses.

FIELD OF THE INVENTION

This invention relates to novel inks having improved properties, more particularly to ink polymer particles with multiple domains of pigment and oil liquid.

BACKGROUND OF THE INVENTION

Conventional electrostatographic toner powders are made up of a binder polymer and other ingredients, such as pigment and a charge control agent, that are melt blended on a heated roll or in an extruder. The resulting solidified blend is then ground or pulverized to form a powder. Inherent in this conventional process are certain drawbacks. For example, the binder polymer must be brittle to facilitate grinding. Improved grinding can be achieved at lower molecular weight of the polymeric binder. However, low molecular weight binders have several disadvantages; they tend to form toner/developer flakes; they promote scumming of the carrier particles that are admixed with the toner powder for electrophotographic developer compositions; their low melt elasticity increases the off-set of toner to the hot fuser rollers of the electrophotographic copying apparatus, and the glass transition temperature (Tg) of the binder polymer is difficult to control. In addition, grinding of the polymer results in a wide particle size distribution. Consequently, the yield of useful toner is lower and the manufacturing costs are higher. Also the toner fines accumulate in the developer station of the copying apparatus and adversely affect the developer life.

Another problem with conventional electrostatographic toner powders is that image quality is limited by the size of the toner particles. Smaller toner particles result in improved image quality but such small toner particles are expensive to manufacture by conventional grinding and pulverizing techniques and suffer from the issues listed above.

The preparation of toner polymer powders from a preformed polymer by the chemically prepared toner process such as the "Evaporative Limited Coalescence" (ELC) offers many advantages over the conventional grinding method of producing toner particles. In this process, polymer particles having a narrow size distribution are obtained by forming a solution of a polymer in a solvent that is immiscible with water, dispersing the solution so formed in an aqueous medium containing a solid colloidal stabilizer and removing the solvent. The resultant particles are then isolated, washed and dried.

In the practice of this technique, polymer particles are prepared from any type of polymer that is soluble in a solvent that is immiscible with water. Thus, the size and size distribution of the resulting particles can be predetermined and controlled by the relative quantities of the particular polymer employed, the solvent, the quantity, and the size of the water insoluble solid particulate suspension stabilizer, typically silica or latex, and the size to which the solvent-polymer droplets are reduced by mechanical shearing using rotor-stator type colloid mills, high pressure homogenizers, agitation etc.

Limited coalescence techniques of this type have been described in numerous US Patents pertaining to the preparation of electrostatic toner particles because such techniques typically result in the formation of polymer particles having a substantially uniform size distribution. Representative limited coalescence processes employed in toner preparation are described in U.S. Pat. Nos. 4,833,060 and 4,965,131 to Nair et al., incorporated herein by reference for all that they contain.

Limited coalescence techniques can produce smaller toner particles with narrower size distributions than grinding and pulverizing. As mentioned previously, these smaller toner particle sizes result in improved image quality. However, even better image quality can be achieved by pigment particles suspended or dispersed in a liquid carrier. The liquid carrier is typically a nonconductive dispersant, to avoid discharging the latent electrostatic image. Liquid toners contain pigments that are typically smaller than dry toner particles. Because of their small particle size, ranging from about 5 microns to sub-micron, liquid toners are capable of producing very high-resolution toned images.

A typical liquid toner composition generally comprises a visual enhancement additive (for example, a colored pigment particle) and a polymeric binder. The choice of pigments is limited to those which are compatible with the electrophotographic process, especially with regard to surface charging properties. Thus, there are pigments which provide desirable color tones but are unsuitable for use as liquid toners. The polymeric binder fulfills functions both during and after the electrophotographic process. With respect to processability, the character of the binder impacts charging and charge stability, flow, and fusing characteristics of the toner particles. These characteristics are important to achieve good performance during development, transfer, and fusing. After an image is formed on the final receptor, the nature of the binder (e.g. glass transition temperature, melt viscosity, molecular weight) and the fusing conditions (e.g. temperature, pressure, and fuser configuration) impact durability (e.g. blocking and erasure resistance), adhesion to the receptor, gloss, and the like.

Polymeric binder materials suitable for use in liquid toner particles typically exhibit glass transition temperatures of about −24° C. to 55° C., which is lower than the range of glass transition temperatures (50° C. to 100° C.) typical for polymeric binders used in dry toner particles. In particular, some liquid toners are known to incorporate polymeric binders exhibiting glass transition temperatures (Tg) below room temperature (25° C) in order to rapidly self fix, e.g., by film formation, in liquid electrophotographic imaging process; see e.g. U.S. Pat. No. 6,255,363. However, such liquid toners are also known to exhibit inferior image durability resulting from the low Tg (e.g. poor blocking and erasure resistance) after fusing the toned image to a final image receptor.

There remains a long standing need for dry toners which have the superior image quality comparable to liquid toners while maintaining the convenience, ease of handling and excellent image durability associated with dry toners. In addition, there is a need for an electrophotographic toner which provides high quality images using any pigment regardless of its surface charge.

Microcapsule toners consisting of a polymeric shell and core of hydrophobic liquid and pigment are known. See, for instance, Japanese Kokai 05-313401, Japanese Kokai 56-142539 and Japanese Kokai 04-296868. These microcapsules have a single liquid domain contained by a thin shell of polymer and are subject to premature breakage during manufacture, for example during sieving or surface treatment, and during the imaging process, resulting in premature release of the entire liquid core. It is difficult to make microcapsules which survive mechanical forces during manufacture and during the imaging process, yet are fragile enough to rupture when desired.

Another issue with microcapsule toners is that the shell frequently doesn't have the properties of polymeric binders as described above. In some cases the polymeric shell does not fuse to the receptor sheet.

Japanese Kokai 63-147171 discloses an electrophotographic developer obtained by impregnating a small-diameter sponge with a liquid developer. The liquid developer is pressed in a development area to discharge the liquid from the sponge. Thus, the small-diameter sponge is only a carrier and is not part of the ink. It does not fuse onto the receptor sheet forming part of the image.

There is a need to improve the image quality of dry electrophotographic toner imaging systems. The present invention achieves this objective by providing an ink having discrete particles made from a polymeric binder typical for dry toners containing a liquid phase of an oil and a very small sized pigment typical for liquid toners. The liquid phase is contained in multiple domains within particles of the polymeric binder which means that the entire liquid content of the particle will not be released by premature breakage.

An object of the present invention is to provide an ink polymer particle having a solid phase and a liquid phase that includes oil and pigment.

A further object of the present invention is to provide an ink polymer particle that does not release the liquid prematurely.

A further object of the present invention is to provide a dry toner particle with improved image quality.

A still further object of the present invention is to provide a dry toner particle that can use any pigment.

SUMMARY OF THE INVENTION

The present invention is an ink comprising a solid phase and a liquid phase wherein the solid phase comprises a polymeric binder and the liquid phase comprises oil and a pigment, the solid phase and the liquid phase forming a discrete particle having multiple domains of the liquid phase.

BRIEF DESCRIPTION OF THE DRAWINGS

FIG. 1 is cross-sectional micrograph of a particle of the present invention.

For a better understanding of the present invention together with other advantages and capabilities thereof, reference is made to the following description and appended claims in connection with the preceding drawings.

DETAILED DESCRIPTION OF THE INVENTION

Inks of the present invention have a solid phase and multiple domains of liquid phase. This means that there are solid particles containing liquid wherein the liquid resides in pockets (domains) within the solid particle.

Each domain is separated from other domains by the solid phase and the domains are, in general, not interconnected with each other or the outer surface. The domains can be any size smaller than the discrete particle, can be only a few in number, as long as there are multiple domains, and can be of any shape It is preferred that the domains are as small and numerous as possible. The shape of the domains can be spherical or irregular.

The solid phase of the present invention can be any type of polymer or resin. Preferred are polymers that are suitable as the binder for dry electrophotographic toners. Usefull polymers include those derived from vinyl monomers, such as styrene monomers, and condensation monomers such as esters and mixtures thereof As the binder polymer, known binder resins are useable. Concretely, these binder resins include homopolymers and copolymers such as polyesters, styrenes, e.g. styrene and chlorostyrene; monoolefins, e.g. ethylene, propylene, butylene and isoprene; vinyl esters, e.g. vinyl acetate, vinyl propionate, vinyl benzoate and vinyl butyrate; a-methylene aliphatic monocarboxylic acid esters, e.g. methyl acrylate, ethyl acrylate, butyl acrylate, dodecyl acrylate, octyl acrylate, phenyl acrylate, methyl methacrylate, ethyl methacrylate, butyl methacrylate and dodecyl methacrylate; vinyl ethers, e.g. vinyl methyl ether, vinyl ethyl ether and vinyl butyl ether; and vinyl ketones, e.g. vinyl methyl ketone, vinyl hexyl ketone, and vinyl isopropenyl ketone. Particularly desirable binder polymers/resins include polystyrene resin, polyester resin, styrene/alkyl acrylate copolymers, styrene/alkyl methacrylate copolymers, styrene/ acrylonitrile copolymer, styrene/butadiene copolymer, styrene/maleic anhydride copolymer, polyethylene resin, and polypropylene resin. They further include polyurethane resin, epoxy resin, silicone resin, polyamide resin, modified rosin, paraffins, and waxes. Also, especially useful are polyesters of aromatic or aliphatic dicarboxylic acids with one or more aliphatic diols, such as polyesters of isophthalic or terephthalic or fumaric acid with diols such as ethylene glycol, cyclohexane dimethanol and bisphenol adducts of ethylene or propylene oxides. Especially preferred is a polymer suitable for ELC which means it is capable of being dissolved in a solvent that is immiscible with water wherein the polymer itself is substantially insoluble in water such as Kao E, Kao N, and Piccotoner 1221.

Preferably the acid values (expressed as milligrams of potassium hydroxide per gram of resin) of the polyester resins are in the range of 2 to 100. The polyesters may be saturated or unsaturated. Of these resins, styrene/acryl and polyester resins are particularly preferable.

In the practice of this invention, it is particularly advantageous to utilize resins having a viscosity in the range of 1 to 100 centipoise when measured as a 20 weight percent solution in ethyl acetate at 25° C.

Pigments suitable for use in the practice of the present invention are disclosed, for example, in U.S. Reissue Pat. No. 31,072 and in U.S. Pat. Nos. 4,416,965 and 4,414,152. As the colorants, known colorants can be used. The colorants include, for example, carbon black, Aniline Blue, Calcoil Blue, Chrome Yellow, Ultramarine Blue, DuPont Oil Red, Quinoline Yellow, Methylene Blue Chloride, Phthalocyanine Blue, Malachite Green Oxalate, Lamp Black, Rose Bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1 ; and C.I. Pigment Blue 15:3. Colorants can generally be employed in the range of from about 1 to about 90 weight percent on a total toner powder weight basis, and preferably in the range of about 2 to about 20 weight percent, and most preferably from 4 to 15 weight percent in the practice of this invention. When the colorant content is 4% or more by weight, a sufficient coloring power can be obtained, and when it is 15% or less by weight, good transparency can be obtained. Mixtures of colorants can also be used. Colorants in any form such as dry powder, its aqueous or oil dispersions, or wet cake can be used in the present invention. Colorant milled by any methods like media-mill or ball-mill can be used as well.

Oils suitable for use in the practice of the present invention are not limited. Examples of suitable oils include aliphatic hydrocarbons (n-pentane, hexane, heptane and the like), cycloaliphatic hydrocarbons (cyclopentane, cyclohexane and the like), aromatic hydrocarbons (benzene, toluene, xylene and the like), halogenated hydrocarbon solvents (chlorinated alkanes, fluorinated alkanes, chlorofluorocarbons and the like), silicone oils, branched paraffinic solvent blends such as Isopar™ G, Isopar™ H, Isopar™ K, Isopar™ L, Isopar™ M and Isopar™ V (available from Exxon Corporation, N.J.), and aliphatic hydrocarbon solvent blends such as Norpar™ 12, Norpar™ 13 and Norpar™ 15 (available from Exxon Corporation, N.J.). Preferred are oils with boiling points above 100° C. Particularly preferred are soybean oil and petroleum hydrocarbons. Also, particularly preferred are oils that do not solubilize the solid phase of the discrete particle.

The oil can optionally contain a microgel as a domain stabilizing material. The microgel is an internally crosslinked polymer or macromolecule, or crosslinked latex particle that forms stable solutions in non-aqueous solvents particularly non-polar hydrocarbon solvents to form stable solutions. Examples of such microgels are described in U.S. Pat. No. 4,758,492, the disclosure of which is hereby incorporated by reference. The essential properties of the domain stabilizing microgels are solubility in the desired organic solvents, particularly low dielectric non-polar solvents, no negative impact on ELC process, and no or little negative impact on fusing and melt rheology of the resulting particles when they are used as dry electrophotographic toners. This is further described in commonly assigned U.S. patent application Ser. Nos. 11/624,335 and 11/624,252.

The inks of this invention are preferably used as dry toners in electrophotographic processes. Various additives generally present in electrophotographic toner may be included in the ink such as charge control agents, shape control agents, and release agents such as waxes and lubricants.

The release agents preferably used herein are waxes. Concretely, the releasing agents usable herein are low-molecular weight polyolefins such as polyethylene, polypropylene, and polybutene; silicone resins which can be softened by heating; fatty acid amides such as oleamide, erucamide, ricinoleamide, and stearamide; vegetable waxes such as carnauba wax, rice wax, candelilla wax, Japan wax, and jojoba oil; animal waxes such as bees wax; mineral and petroleum waxes such as montan wax, ozocerite, ceresine, paraffin wax, microcrystalline wax, and Fischer-Tropsch wax; and modified products thereof. When a wax containing a wax ester having a high polarity, such as carnauba wax or candelilla wax, is used as the releasing agent, the amount of the wax exposed to the toner particle surface is inclined to be large. On the contrary, when a wax having a low polarity such as polyethylene wax or paraffin wax is used, the amount of the wax exposed to the toner particle surface is inclined to be small.

Irrespective of the amount of the wax inclined to be exposed to the toner particle surface, waxes having a melting point in the range of 30° C. to 150° C. are preferred and those having a melting point in the range of 40° C. to 140° C. are more preferred.

The wax is, for example, 0.1 to 20% by mass, and preferably 0.5 to 9% by mass, based on the toner.

The term "charge control" refers to a propensity of a toner addendum to modify the triboelectric charging properties of the resulting toner. A very wide variety of charge control agents for positive charging toners are available. A large, but lesser number of charge control agents for negative charging toners, is also available. Suitable charge control agents are disclosed, for example, in U.S. Pat. Nos. 3,893,935; 4,079,014; 4,323,634; 4,394,430; and GB Patent Nos. 1,501,065 and 1,420,839. Charge control agents are generally employed in small quantities such as, from about 0.1 to about 5 weight percent based upon the weight of the toner. Additional charge control agents that are useful are described in U.S. Pat. Nos. 4,624,907; 4,814,250; 4,840,864; 4,834,920; 4,683,188; and 4,780,553. Mixtures of charge control agents can also be used.

The present invention is not limited by the process used to make the inks. However, the preferred process for making the inks of this invention involves formation of an aqueous emulsion where the dispersed phase consists of polymeric binder dissolved in an organic solvent along with pigment and oil. The organic solvent is then removed.

Any suitable organic solvent that will dissolve the polymer and which is also immiscible with water may be used, such as for example, chloromethane, dichloromethane, ethyl acetate, propyl acetate, vinyl chloride, trichloromethane, carbon tetrachloride, ethylene chloride, trichloroethane, toluene, xylene, cyclohexanone, 2-nitropropane, and the like. Particularly useful solvents are ethyl acetate and propyl acetate for the reason that they are both good solvents for many polymers while at the same time being sparingly soluble in water. Further, their volatility is such that they are readily removed from the discontinuous phase droplets as described below, by evaporation.

Optionally, the solvent that will dissolve the polymer and which is immiscible with water may be a mixture of two or more water-immiscible solvents chosen from the list given above.

An emulsion is formed by dispersing the above-mentioned polymer solution in an aqueous phase containing either stabilizer polymers such as poylvinylpyrrolidone or polyvinylalcohol or more preferably a Limited Coalescence process using colloidal silica such as LUDOX® or NALCO or latex particles in a modified Evaporative Limited Coalescence (ELC) process described in U.S. Pat. Nos. 4,833,060; 4,965,131; 2,934,530; 3,615,972; 2,932,629; and 4,314,932, the disclosures of which are hereby incorporated by reference.

Preferably, the polymer solution is mixed with an aqueous phase containing colloidal silica stabilizer to form an aqueous suspension of droplets that is subjected to shear or extensional mixing or similar flow processes, preferably through an orifice device to reduce the droplet size and achieve narrow size distribution droplets through the limited coalescence process. The pH of the aqueous phase is generally between 4 and 7 when using silica as the colloidal stabilizer.

The actual amount of silica used for stabilizing the droplets depends on the size of the final porous particle desired as with a typical limited coalescence process, which in turn depends on the volume and weight ratios of the various phases used for making the emulsion.

Any type of mixing and shearing equipment may be used to perform the second step of this invention, such as a batch mixer, planetary mixer, single or multiple screw extruder, dynamic or static mixer, colloid mill, high pressure homogenizer, sonicator, or a combination thereof. While any high shear type agitation device is applicable to this step of the present invention, a preferred homogenizing device is the Microfluidizer® such as Model No. 110T produced by Microfluidics Manufacturing. In this device, the droplets of polymer solution are dispersed and reduced in size in the aqueous phase (continuous phase) in a high shear agitation zone and, upon exiting this zone, the particle size of the dispersed oil is reduced to uniform sized dispersed droplets in the continuous phase. The temperature of the process can be modified to achieve the optimum viscosity for emulsification of the droplets and to control evaporation of the solvent. In the method of this invention, the range of back pressure suitable for producing acceptable particle size and size distribution is between 100 and 5000 psi, preferably between 500 and 3000 psi. The preferable flow rate is between 1000 and 600 mL per minute.

Next, removal of the organic solvent is done to produce inks consisting of discrete particles having multiple domains of oil and pigment. Solvent removal apparatus such as a rotary evaporator or a flash evaporator may be used. The polymer particles are isolated after removing the organic solvent by filtration or centrifugation, followed by drying in an oven at 40° C. that removes residual water. Optionally, the particles are treated with alkali to remove the silica stabilizer.

Optionally, the solvent removal step described above may include the addition of more water prior to removal of the solvent or at any time during solvent removal, isolation, and drying.

The average particle diameter of the discrete particles of the present invention is, for example, 2 to 50 micrometers, preferably 3 to 20 micrometers.

The discrete particles of this invention can be spherical or irregular in shape. However, the shape of toner particles has a bearing on the electrostatic toner transfer and cleaning properties. Thus, for example, the transfer and cleaning efficiency of toner particles have been found to improve as the sphericity of the particles is reduced. A number of procedures to control the shape of toner particles are known in the art. In the practice of this invention, additives may be employed in the water phase or in the organic solvent phase if necessary. The additives may be added after or prior to forming the oil-in-water emulsion. In either case the interfacial tension is modified as the solvent is removed resulting in a reduction in sphericity of the particles. U.S. Pat. No. 5,283,151 describes the use of carnauba wax to achieve a reduction in sphericity of the particles. U.S. Ser. No. 11/611,208 filed Dec. 15, 2006 entitled "TONER PARTICLES OF CONTROLLED SURFACE MORPHOLOGY AND METHOD OF PREPARATION" describes the use of certain metal carbamates that are useful to control sphericity and U.S. Ser. No. 11/621,226 filed Dec. 15, 2006 entitled "TONER PARTICLES OF CONTROLLED MORPHOLOGY" describes the use of specific salts to control sphericity. U.S. Ser. No. 11/472,779 filed Jun. 22, 2006 entitled "TONER PARTICLES OF CONTROLLED MORPHOLOGY" describes the use of quaternary ammonium tetraphenylborate salts to control sphericity. These applications are incorporated by reference herein.

Toner particles of the present invention may also contain flow aids in the form of surface treatments. Surface treatments are typically in the form of inorganic oxides or polymeric powders with typical particle sizes of 5 nm to 1000 nm. With respect to the surface treatment agent also known as a spacing agent, the amount of the agent on the toner particles is an amount sufficient to permit the toner particles to be stripped from the carrier particles in a two component system by the electrostatic forces associated with the charged image or by mechanical forces. Preferred amounts of the spacing agent are from about 0.05 to about 10 weight percent, and most preferably from about 0.1 to about 5 weight percent, based on the weight of the toner.

The spacing agent can be applied onto the surfaces of the toner particles by conventional surface treatment techniques such as, but not limited to, conventional powder mixing techniques, such as tumbling the toner particles in the presence of the spacing agent. Preferably, the spacing agent is distributed on the surface of the toner particles. The spacing agent is attached onto the surface of the toner particles and can be attached by electrostatic forces or physical means or both. With mixing, uniform mixing is preferred and achieved by such mixers as a high energy Henschel-type mixer which is sufficient to keep the spacing agent from agglomerating or at least minimizes agglomeration. Furthermore, when the spacing agent is mixed with the toner particles in order to achieve distribution on the surface of the toner particles, the mixture can be sieved to remove any agglomerated spacing agent or agglomerated toner particles. Other means to separate agglomerated particles can also be used for purposes of the present invention.

The preferred spacing agent is silica, such as those commercially available from Degussa, like R-972, or from Wacker, like H2000. Other suitable spacing agents include, but are not limited to, other inorganic oxide particles, polymer particles and the like. Specific examples include, but are not limited to, titania, alumina, zirconia, and other metal oxides; and also polymer particles preferably less than 1 μm in diameter (more preferably about 0.1 μm), such as acrylic polymers, silicone-based polymers, styrenic polymers, fluoropolymers, copolymers thereof, and mixtures thereof.

The present invention is not limited to the incorporation of liquid toner inks in the multiple domains. The multiple domains may contain offset inks or inkjet inks.

EXAMPLES

The Kao Binder E and N, both polyester resins, used in the examples below were obtained from Kao Specialties Americas LLC a part of Kao Corporation, Japan. Nalco 2329™, a colloidal silica, was obtained from Nalco as a 40 weight percent dispersion. Piccotoner 1221 was obtained from Hercules Powder Co. 725 Series Cyan pigmented offset ink concentrate was obtained from Kohl and Madden. The liquid toner ink concentrate used was HP Electro ink black concentrate. The microgel M1, used in Example 6 was poly(isobutyl methacrylate-co-2-ethylhexyl methacrylate-co-divinylbenzene in a weight ratio of 62/35/3) and was made using emulsion polymerization reaction as described in U.S. Pat. No. 4,758,492. The surface treatment agent used in these examples was R-972, a silica from Degussa.

The particle size was characterized by a Horiba Particle Analyzer. The volume median value from the measurements is used to represent the particle size of the particles described in these examples.

Example 1 (Invention) Offset Ink/Dry Toner Hybrid

Kao E polymer resin (18 grams) was dissolved in 72 grams of ethyl acetate and to it was added a dispersion of 5.0 grams 725 Series Cyan offset ink mixed with 5.0 grams soybean oil. This was dispersed in 139 grams of a water phase comprising a pH 4 citrate/phosphate buffer and 11 grams of NALCO™ 2329 followed by shearing with a Silverson L4R Mixer then homogenization in a Microfluidizer® Model #110T to form a limited coalescence (LC) emulsion. The ethyl acetate was evaporated using a Buchi RotaVapor RE120 at 35° C. under reduced pressure to yield discrete toner particles with multiple domains of soybean oil containing the offset ink dispersion. The silica on the surface of the toner was removed using 1N potassium hydroxide. The toner was then washed and dried. The median particle size was 15.6 micrometers. The toner was surface treated with R972 before measuring the tribocharge. The charge to mass was—30 μC/g. A bias developed patch on a paper receiver was fused to give a glossy cyan image that adhered well to the paper.

Example 2 (Invention) Liquid Ink/Dry Toner Hybrid

This toner was prepared as in Example 1 except that 5.0 grams HP Black electro ink was used in place of the cyan offset ink and 5.0 grams of petroleum hydrocarbon was used in place of the soybean oil. The toner containing multiple domains of petroleum hydrocarbon ink dispersion had a mean particle size of 17.2 micrometers and charge of −65 μC/g upon surface treatment as in Example 1.

Examples 1 and 2 show that inks of the instant invention can be used in a typical electrophotographic printer. The advantage is that offset inks can be used effectively in such printers. This opens up the range of printing inks that can be used in a digital electrophotographic press and allows the use of offset inks in the digital arena.

Example 3 (Invention)

This toner was prepared as in Example 2 except that no petroleum hydrocarbon was used. The oil required for this invention was in the HP ElectroInk® Black concentrate. This example that resulted in discrete particles having multiple domains of oil and shows that a wide range of oils are amenable to the particles of the present invention.

Example 4 (Invention)

This toner was prepared as in Example 2 except that Kao N was used instead of Kao E and the petroleum hydrocarbon used as the oil was reduced from 5.0 grams to 2.5 grams.

Example 5 (Invention)

This toner was prepared as in Example 4 except that the binder used was Piecotoner 1221 instead of Kao N.

Examples 4 and 5 both resulted in discrete particles with multiple domains showing that a variety of binders can be used in the present invention.

Example 6 (Invention)

This Example was the same as Example 2 except that 2.5 grams of dodecane containing 20% M1 was used as the oil in place of the petroleum hydrocarbon.

Optical microscopy of the toner samples prepared in Examples 1 to 6 all illustrate the presence of multiple domains of the liquid ink dispersion in the dry toner. FIG. 1 shows a cross-section of the sample prepared in Example 6.

The invention has been described in detail with particular reference to certain preferred embodiments thereof but it should be appreciated that variations and modifications can be effected within the scope of the invention.

The invention claimed is:

1. An ink comprising:
   a discrete ink polymer particle comprising a solid phase and a liquid phase wherein the solid phase comprises a polymeric binder and the liquid phase comprises an oil that does not solubilize the solid phase and a pigment, the solid phase and the liquid phase forming the discrete ink polymer particle having multiple domains of the liquid phase contained within the solid phase.

2. The ink of claim 1 wherein the solid phase fluffier comprises waxes, shape control agents, and charge control agents.

3. The ink of claim 1 wherein the polymeric binder is selected from the group consisting of polyesters, polymers of styrenes, monoolefins, vinyl chloride, vinyl esters, methylene aliphatic monocarboxylic acid esters, vinyl ethers, and vinyl ketones.

4. The ink of claim 1 wherein the discrete ink polymer particle has a size of from 2 to 50 microns.

5. The ink of claim 1 wherein the oil is selected from the group consisting of aliphatic hydrocarbons, cycloaliphatic hydrocarbons, aromatic hydrocarbons, halogenated hydrocarbon solvents, silicone oils paraffinic solvent blends, and aliphatic hydrocarbon solvent blends.

6. The ink of claim 1 wherein the oil comprises soybean oil or petroleum hydrocarbon.

7. The ink of claim 1 wherein the liquid phase further comprises a microgel.

8. The ink of claim 1 wherein the pigment is selected from the group consisting of carbon black, aniline blue, calcoil blue, chrome yellow, ultramarine blue, DuPont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment Blue 15:1, and C.I. Pigment Blue 15:3.

9. The ink of claim 1 wherein the discrete polymer particle comprises a dry toner particle.

10. The ink of claim 9 wherein the toner particle further comprises at least one of charge control agents, spacing agents, and release agents.

11. A dry electrophotographic toner comprising:
    a plurality of discrete toner particles, each comprising;
    a solid phase portion comprising a polymeric binder, and a liquid phase portion comprising an oil that does not solubilize the solid phase and a pigment contained within a plurality of separate domains formed within the polymeric binder.

12. The dry electrophotographic toner of claim 11 wherein each separate domain comprises a pocket in the polymeric binder and containing the oil and pigment separated from other pockets and the surface of the toner particle by the solid phase portion.

13. The dry electrophotographic toner of claim 12 wherein the pockets contain substantially all the oil and pigment in the dry electrophotographic toner to ensure that the entire liquid phase portion of each toner particle is not released by breakage of a container of dry electrophotographic toner.

14. The dry electrophotographic toner of claim 11 wherein the toner particle has a size of between about 2 to 50 microns.

15. The dry electrophotographic toner of claim 11 wherein the plurality of separate domains are of any size smaller than the solid phase portion.

16. The dry electrophotographic toner of claim 11 wherein the plurality of separate domains are of any shape.

17. The dry electrophotographic toner of claim 11 wherein the solid phase portion having a reduction in sphericity forming an irregular shape.

18. The dry electrophotographic toner of claim 11 wherein the pigment is selected from the group consisting of carbon black, aniline blue, calcoil blue, chrome yellow, ultramarine blue, DuPont oil red, quinoline yellow, methylene blue chloride, phthalocyanine blue, malachite green oxalate, lamp black, rose bengal, C.I. Pigment Red 48:1, C.I. Pigment Red 122, C.I. Pigment Red 57:1, C.I. Pigment Yellow 97, C.I. Pigment Yellow 12, C.I. Pigment Yellow 17, C.I. Pigment blue 15:1, and C.I. Pigment blue 15:3.

19. The dry electrophotographic toner of claim 11 wherein the discrete toner particle comprises a dry toner particle.

* * * * *